United States Patent
Xiong et al.

(10) Patent No.: US 11,233,956 B2
(45) Date of Patent: Jan. 25, 2022

(54) SENSOR SYSTEM WITH LOW POWER SENSOR DEVICES AND HIGH POWER SENSOR DEVICES

(71) Applicant: Western Digital Technologies, Inc., San Jose, CA (US)

(72) Inventors: Shaomin Xiong, Fremont, CA (US); Toshiki Hirano, San Jose, CA (US); Haoyu Wu, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 24 days.

(21) Appl. No.: 16/836,764

(22) Filed: Mar. 31, 2020

(65) Prior Publication Data
US 2021/0306578 A1    Sep. 30, 2021

(51) Int. Cl.
*H04N 5/355*    (2011.01)
*G06N 20/00*    (2019.01)

(52) U.S. Cl.
CPC ............. *H04N 5/355* (2013.01); *G06N 20/00* (2019.01)

(58) Field of Classification Search
CPC ................................ H04N 5/355; G06N 20/00
See application file for complete search history.

(56) References Cited

U.S. PATENT DOCUMENTS

| 7,643,055 B2 | 1/2010 | Uebbing |
| RE44,225 E | 5/2013 | Aviv |
| 2004/0061780 A1 | 4/2004 | Huffman |
| 2004/0212678 A1 | 10/2004 | Cooper et al. |
| 2019/0222756 A1 | 7/2019 | Moloney et al. |
| 2020/0108796 A1* | 4/2020 | Bjorkengren .... G08B 13/19695 |
| 2020/0311577 A1* | 10/2020 | Exner .................. G01R 21/133 |
| 2021/0117818 A1* | 4/2021 | Teng ..................... G06N 20/00 |

FOREIGN PATENT DOCUMENTS

EP    3502954 A1    6/2019

OTHER PUBLICATIONS

"Hybrid Internet of Things Network for Energy Efficient Video Surveillance"; by Diratie et al.; published Jun. 2020; 2020 IEEE 6th World Forum on Internet of Things (WF-IoT) (Year: 2020).*

* cited by examiner

Primary Examiner — Roy Y Yi
Assistant Examiner — Geoffrey T Evans
(74) Attorney, Agent, or Firm — Ravi Mohan; Rutan & Tucker, LLP (57) ABSTRACT

In one embodiment, a sensor device includes a sensor configured to obtain sensor data and a communication interface configured to communicate with a set of secondary sensor devices. The set of secondary sensor devices comprise a set of secondary sensors and a set of secondary processing devices. The set of secondary sensors obtain additional sensor data. The set of secondary processing devices process the additional sensor data based on a set of secondary machine learning models, and generate activation data based on the additional sensor data. The sensor device also includes a processing device. The processing device is also configured to receive the activation data from the set of secondary sensor devices and cause the sensor to obtain first sensor data based on the activation data. The processing device is further configured to generate one or more inferences based on the first sensor data and a machine learning model.

23 Claims, 5 Drawing Sheets

SENSOR SYSTEM WITH LOW POWER SENSOR DEVICES AND HIGH POWER SENSOR DEVICES

BACKGROUND

Field of the Disclosure

This disclosure relates to sensor device. More particularly, the disclosure relates to a sensor system with lower power sensor devices and high power sensor devices.

Description of the Related Art

Sensor devices may be used to capture, obtain, collect, detect, sense, etc., sensor data. The sensor data may indicate information about the area, location, environment, etc., where the sensor device is located. For example, the sensor device may be an audio sensor and the sensor data may be audio data (e.g., audio, sounds, etc.) that was detected by the audio sensor. In another example, the sensor device may be a camera sensor and the sensor data may be image/video data (e.g., images, videos, frames, etc.) that were captured (e.g., collected, obtained, recorded, etc.) by the camera sensor.

SUMMARY

In some embodiments, a sensor device is provided. The sensor device includes a sensor configured to obtain sensor data and a communication interface configured to communicate with a set of secondary sensor devices. The set of secondary sensor devices comprise a set of secondary sensors and a set of secondary processing devices. The set of secondary sensors are configured to obtain additional sensor data. The set of secondary processing devices are configured to process the additional sensor data based on a set of secondary machine learning models, and to generate activation data based on processing the additional sensor data through the set of secondary machine learning models. The sensor device also includes a processing device coupled to the sensor. The processing device is configured to operate the sensor device in a first power state. The processing device is also configured to receive the activation data from the set of secondary sensor devices. The processing device is further configured to transition the sensor device to a second power state that consumes more power than the first power state. The processing device is further configured to cause the sensor to obtain first sensor data based on the activation data. The processing device is further configured to generate one or more inferences based on the first sensor data and a machine learning model, wherein the sensor device at the second power state consumes more power than each secondary sensor device.

In some embodiments, a sensor device is provided. The sensor device includes a sensor configured to obtain sensor data and a communication interface configured to communicate with a primary sensor device. The primary sensor device comprises a primary sensor and a primary processing device. The primary sensor is configured to obtain primary sensor data. The primary processing device is configured to process the primary sensor data through a primary machine learning model based on activation data. The sensor device also includes a processing device coupled to the sensor. The processing device is configured to receive the sensor data from the sensor. The processing device is also configured to generate one or more inferences based on the sensor data and a machine learning model. The processing device is further configured to transmit activation data to the primary sensor device based on the one or more inferences. The sensor device consumes less power than the primary sensor device. The activation data causes the primary sensor device to obtain additional sensor data.

In some embodiments, a method is provided. The method includes operating a sensor device in a first power state. The method also includes receiving, by the sensor device, activation data from a set of secondary sensor devices. The set of secondary sensor devices comprise a set of secondary sensors and a set of secondary processing devices. The set of secondary sensors are configured to obtain additional sensor data. The set of secondary processing devices are configured to process the additional sensor data based on a set of secondary machine learning models, and to generate the activation data based on processing the additional sensor data through the set of secondary machine learning models. The method further includes causing a sensor of the sensor device to obtain first sensor data based on the activation data. The method further includes generating one or more inferences based on the first sensor data and a machine learning model, wherein the sensor device consumes more power than each of the set of secondary sensor devices.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following disclosure, reference is made to examples, implementations, and/or embodiments of the disclosure. However, it should be understood that the disclosure is not limited to specific described examples, implementations, and/or embodiments. Any combination of the features, functions, operations, components, modules, etc., disclosed herein, whether related to different embodiments or not, may be used to implement and practice the disclosure. Furthermore, although embodiments of the disclosure may provide advantages and/or benefits over other possible solutions, whether or not a particular advantage and/or benefit is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

The headings provided herein are for convenience only and do not necessarily affect the scope or meaning of the claimed invention. Disclosed herein are example implementations, configurations, and/or embodiments relating to processing sensor data generated by sensor devices.

As discussed above, sensor devices may be used to capture, obtain, collect, detect, sense, etc., sensor data. The sensor data may indicate information about the area, location, environment, etc., where the sensor device is located. The sensor data may be used to determine whether conditions, criteria, thresholds, etc., have been met, or whether something as occurred in an area/location/environment. To properly detect conditions, thresholds, events, etc., a sensor device may operate continually. For example, the sensor device may continually obtain and process/analyze sensor data. However, operating continually (e.g., operating continually at a higher power state or full power state) may cause the sensor device to consume more energy (which may drain a sensor device's power supply, such as a battery). Some sensor devices use a motion sensor (and other similar devices) to trigger the sensor device to obtain/capture sensor data (e.g., to transition from a lower power state to a higher power state). However, motion sensors (and other similar devices) are often prone to error and/or false positives which may cause the sensor devices to waste power. The motion sensors may also not be able to detect certain conditions, criteria, thresholds, etc. For example, a motion sensor may detect movement but may not be able to determine whether it is a person moving or an animal moving.

In various embodiments, examples, and/or implementations disclosed herein, a primary sensor device (e.g., a high/higher power sensor device) is grouped with one or more secondary sensor devices (e.g., a low/lower power sensor device). The secondary sensor devices may consume less power than the primary sensor device. The primary sensor device may have a more powerful and/or higher quality sensor than the secondary sensor devices which may consumer more power than sensors on the secondary sensor devices. In addition, the primary sensor device may also have a more powerful process than which may consume more power than the processors on the secondary sensor devices. Furthermore, the primary sensor device may us a machine learning model that uses more power to execute when compared with the machine learning models on the secondary sensor devices. The secondary sensor devices may continually obtain sensor data and process the sensor data using machine learning models. When conditions, criteria, thresholds, events, etc., are detected, the secondary sensor device may trigger or cause the primary sensor device to obtain sensor data and process the sensor data. This may allow a sensor system to have an always-on lower power sensor device which may trigger/activate a higher power sensor device, which results in more efficient energy/power usage by the different sensor devices. In addition, the secondary sensor devices also include machine learning models which allow the secondary sensor devices to detect more thresholds, criteria, conditions, events, etc.

Figure 1:
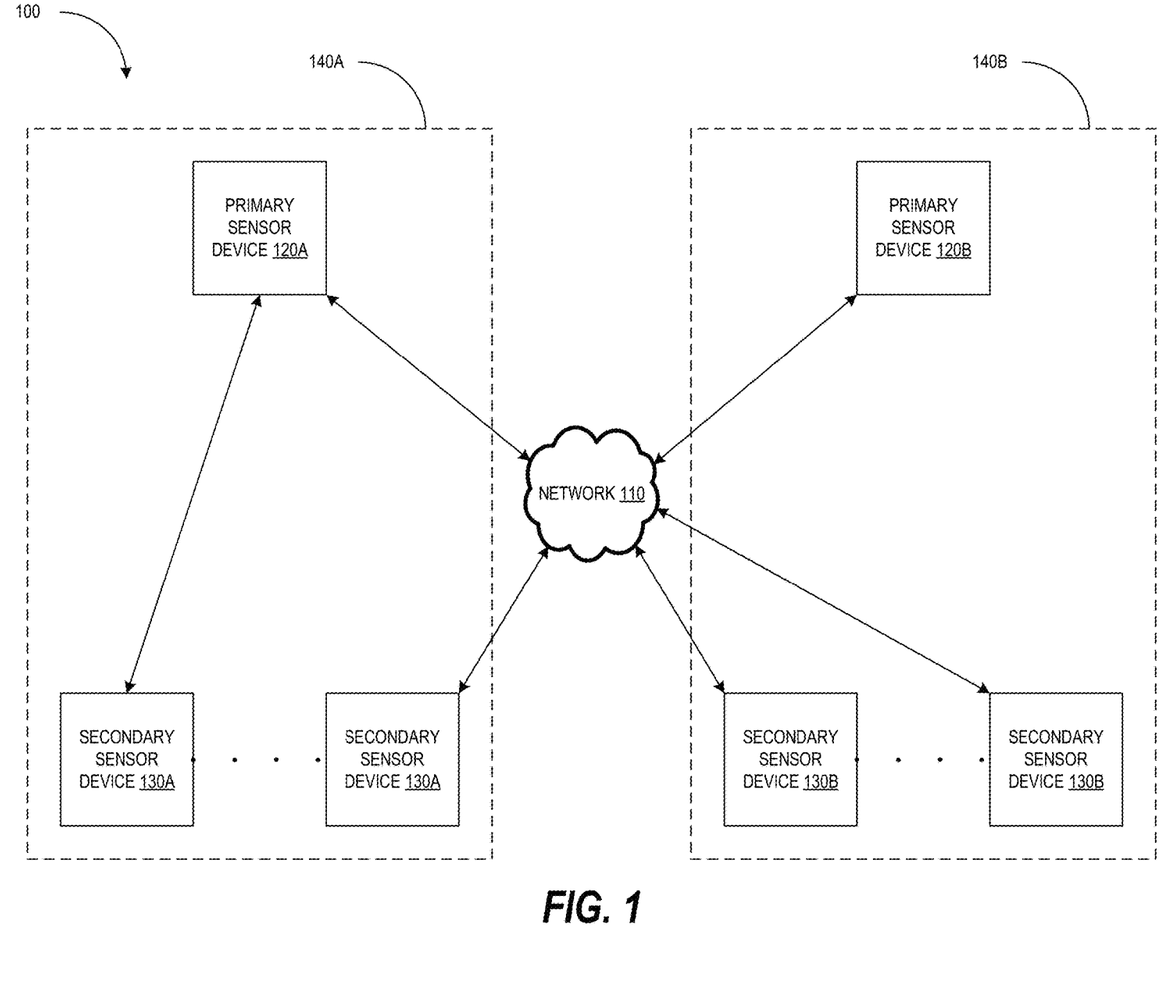
FIG. 1 is a block diagram illustrating an example system architecture, in accordance with one or more embodiments of the present disclosure.

FIG. 1 is a diagram illustrating an example system architecture 100, in accordance with some embodiments of the present disclosure. The system architecture 100 may be referred to as a sensor system. The system architecture 100 includes a network 110, primary sensor device 120A, primary sensor device 120B, secondary sensor devices 130A, and second sensor devices 130B. The system architecture 100 also includes sensor group 140A and sensor group 140B. Primary sensor devices 120A and secondary sensor devices 130A are part of sensor group 140A. Primary sensor device 120B and secondary sensor devices 130B are part of sensor group 140B. The primary sensor devices 120A and 120B, and the secondary sensor devices 130A and 130B may each collect, obtain, detect, etc., sensor data. The sensor data may provide information about the area, environment, etc., where a sensor is located.

In one embodiment, the primary sensor devices 120A and 120B may include sensors that capture, obtain, take, etc., pictures and/or video (e.g., that obtain sensor data) of an area, environments, etc. For example, the primary sensor devices 120A and 120B may be digital cameras, video cameras, etc. The primary sensor devices 120A and 120B may include various components, modules, circuits, etc., to obtain video and/or images (e.g., sensor data). For example, the primary sensor devices 120A and 120B may each include a sensor, such as a camera sensor, a charge-coupled device (CCD) array, an image sensor, etc. Each of the primary sensor devices 120A and 120B may also include a processing device (e.g., a central processing unit (CPU), a graphics processing unit (GPU), a controller, a field programmable gate array (FPGA), an application specific integrated circuit (ASIC), a processing core, etc.).

Each of the primary sensor devices 120A and 120B may further include one or more machine learning models. A machine learning model may use the sensor data and may generate one or more inferences, outputs, results, etc., based on the sensor data. One type of machine learning model may be a neural network. A neural network may be a collection of connected and/or interconnected nodes. The nodes may also be referred to as neurons. Each node may transmit a signal, messages, data, information, etc., to one or more other nodes. A node may receive a signal, message, data, information, etc., from another node and may generate additional signals, messages, data, information, etc., to transmit to other nodes that are connected to it. The neural network may be a computing model that may be used to determine a feature in input data through various computations. The neural network may determine a feature (e.g., a number, shape, pattern, etc.) in input data (e.g., audio data, image data, video data, etc.) according to a structure that defines a sequence of computations to be performed, and weight values that define coefficients applied to the computations. The neural network may also include weights or weight values. The weights or weight values may be scaling factors between two or more nodes. For example, the structure may be represented as connections of different nodes, where each node represents a summation of its inputs, and a weight value associated with a connection may represent a coefficient or a scaling factor multiplied to an output of a node in that connection.

One type of neural network may be a convolutional neural network (CNN). A CNN may be a feed forward neural network. A feed forward neural network may be a type of neural network where the connections between the nodes do not form a cycle. Another type of neural network may be a recurrent neural network (RNN). A RNN may be a neural network where the connections between nodes may form a directed graph. A RNN may be a type of neural network where the connections between the nodes may form a cycle. Although a neural network may be discussed herein, other types of machine learning models, functions, algorithms etc., may be used in other embodiments.

In one embodiment, the secondary sensor devices 130A and 130B may also include sensors that capture, obtain, take, etc., pictures and/or video (e.g., that obtain sensor data) of an area, environments, etc. For example, the secondary sensor devices 130A and 130B may also be digital cameras, video cameras, etc. The secondary sensor devices 130A and 130B may also include various components, modules, circuits, etc., to obtain video and/or images (e.g., sensor data). For example, each secondary sensor device 130A and 130B may include a sensor (e.g., a camera sensor), a processing device, and/or one or more machine learning models. In other embodiments, the secondary sensor device 130A and 130B may be other types of sensor devices. For example, the secondary sensor devices 130A and 130B may be audio sensor devices (e.g., sensor devices with microphones), thermal sensor devices (e.g., sensor devices with a thermal/temperature sensor), etc.

As discussed above, it may be useful for sensor devices to obtain sensor data when events, conditions, thresholds, etc., occur. However, for a sensor device to determine when an event, condition, threshold, etc., has occurred, the sensor device may continually obtain and/or analyze sensor data. This may cause the sensor device to use more power to operate. In addition, it may be useful to obtain (e.g., capture, record, detect, etc.) higher quality sensor data. For example, a higher resolution image/video may allow the sensor device to better analyze the image/video and/or to generate better inferences. A sensor device may use a more advanced or more powerful sensor with more features to obtain the higher quality sensor data. However, more advanced/powerful sensors with more features may also consume more power to operate. Furthermore, a more powerful (e.g., faster) processing device may allow the sensor to process/analyze sensor data more quickly. However, a more powerful processing device may consumer more power to operate.

In one embodiment, the secondary sensor devices 130A and 130B may be sensor devices that continually obtain sensor data. For example, the secondary sensor devices 130A and 130B may obtain sensor data (e.g., may capture video and/or images) every few milliseconds, every second, etc. The secondary sensor devices 130A and 130B may be referred to as always-on devices. An always-on device may be a sensor device that continually obtains sensor data and/or analyzes the sensor data (e.g., analyze the sensor data using a machine learning model).

In one embodiment, the secondary sensor devices 130A and 130B may consume, use, etc., less power than the primary sensor devices 120A and 120B. For example, the sensors (e.g., camera sensors) of the secondary sensor device 130A may use less power than the sensor (e.g., camera sensor) of the primary sensor device 120A. The sensors of the secondary sensor devices 130A may be lower power, or lower resolution camera sensors, when compared to the sensor of the primary sensor device 120A which may be a higher resolution or higher power camera sensor. In another example, the processing devices and/or machine learning models used by the secondary sensor devices 130B may use less power than the processing devices and/or machine learning models used by the primary sensor device 120B.

As illustrated in FIG. 1, the primary sensor devices 120A and 120B, and the secondary sensor devices 130A and 130B are divided into sensor groups 140A and 140B. Sensor group 140A includes primary sensor devices 120A and secondary sensor devices 130A. The primary sensor device 120A may be coupled to the network 110. The secondary sensor devices 130A may also be coupled to the network 110 and/or may be coupled to the primary sensor device 120A. For example, one of the secondary sensor devices 130A may be directly coupled to the primary sensor device 120A via a cable, bus, wires, etc. Sensor group 140B includes primary sensor device 120B and secondary sensor devices 130B. The primary sensor device 120B and secondary sensor devices 130B may be coupled to the network 110. The network 110 may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network, a 4G network, a 5G network), routers, hubs, switches, server computers, other types of computer networks, and/or a combination thereof.

In one embodiment, a secondary sensor device may be located at the same location as a primary sensor. For example, the primary sensor device 120A and a secondary sensor device 130A may have a same view of an area where the primary sensor device 120A and the secondary sensor device 130A are located. In another embodiment, a secondary sensor device may be located at a different location than the primary sensor device. For example, the primary sensor device 120B and a secondary sensor device 130B may have different views of an area where the primary sensor device 120B and the secondary sensor device 130B are located.

In one embodiment, the secondary sensor devices 130A and 130B may cause/trigger the primary sensor devices 120A and 120B to obtain, collect, detect, sense, etc., sensor data. For example, a secondary sensor device 130A may detect an object, a person, movement, etc., based on sensor data obtained or collected by the secondary sensor device 130A. The secondary sensor device 130A may transmit activation data (e.g., a message, an instruction, or some other appropriate data) to the primary sensor device 120A. The activation data may cause the primary sensor device 120A to collect sensor data, as discussed in more detail below. This may allow the secondary sensor devices 130A and 130B to cause or trigger the primary sensor devices 120 to collect sensor data, as discussed below.

In one embodiment, the secondary sensor devices 130A and 130B may also use machine learning models to determine whether an object has been detected. For example, the secondary sensor devices 130A and 130B may provide sensor data to machine learning models to detect whether a condition, trigger, threshold, etc., has been met (e.g., whether movement was detected, whether a certain type of object was detected, etc.). This may allow the secondary sensor devices 130A and 130B to trigger the primary sensor devices 120A and 120B more efficiently. For example, the secondary sensor devices 130A and 130B may trigger the primary sensor devices 120A and 120B with fewer false positives. This may allow the primary sensor devices 120A and 120B to operate more efficiently (e.g., to use less power) than if a standard motion sensor (e.g., a passive infrared sensor) was used to trigger/activate the primary sensor devices 120A and 120B (e.g., a because the primary sensor devices 120A and 120B will be activated/triggered less due to fewer false positive.

In some embodiments, the secondary sensor devices 130A and 130B may be coupled to the primary sensor devices 120A and 120B (directly or via the network 110) to replace existing devices that trigger the primary sensor devices 120A and 120B. For example, the primary sensor device 120A may have been configured to operate with a PIR sensor. The primary sensor device 120 may be retrofitted with the secondary sensor device 130A (e.g., the secondary sensor devices 130A may replace the PIR sensor).

This may allow the secondary sensor devices 130A and 130B to operate in conjunction with a wide variety of primary sensor devices. For example, the secondary sensor devices 130A and 130B can operate in conjunction with various makes and/or models of camera devices.

In some embodiments, the primary sensor devices 120A and 120B and the secondary sensor devices 130A and 130B may provide feedback and/or data to each other. For example, a secondary sensor device 130A may provide data to the primary sensor device 120A to allow the primary sensor device 120A to analyze sensor data more quickly and/or efficiently (e.g., to change settings on a sensor, to improve inferences/output generated by a machine learning model, etc.). In another example, a primary sensor device 120B may provide data to a secondary sensor device 130B to reduce the false positives reported by the secondary sensor device 130B.

As discussed above, to properly detect conditions, thresholds, events, etc., a sensor device may operate continually. However, operating continually (e.g., operating continually at a higher power state or full power state) may cause the sensor device to consume more energy (which may drain a sensor devices power supply, such as a battery). In addition, using a motion sensor (and other similar devices) may be error prone and/or may generate false positives which may cause the sensor devices to waste power. Furthermore, the motion sensors may also not be able to detect certain conditions, criteria, thresholds, events, etc.

In various embodiments, examples, and/or implementations disclosed herein, a primary sensor device (e.g., a high/higher power sensor device) is grouped with one or more secondary sensor devices (e.g., a low/lower power sensor device). The secondary sensor devices may continually obtain sensor data and process the sensor data using machine learning models. When conditions, criteria, thresholds, events, etc., are detected, the secondary sensor device may trigger or cause the primary sensor device to obtain sensor data and process the sensor data. This may allow a sensor system to have an always-on lower power sensor device which may trigger/activate a higher power sensor device, which results in more efficient energy/power usages by the different sensor devices. In addition, the secondary sensor devices also include machine learning models which allow the secondary sensor devices to detect more thresholds, criteria, conditions, events, etc. This may allow the sensor system to detect thresholds, criteria, conditions, events, more quickly, efficiently, and/or accurately.

Figure 2:
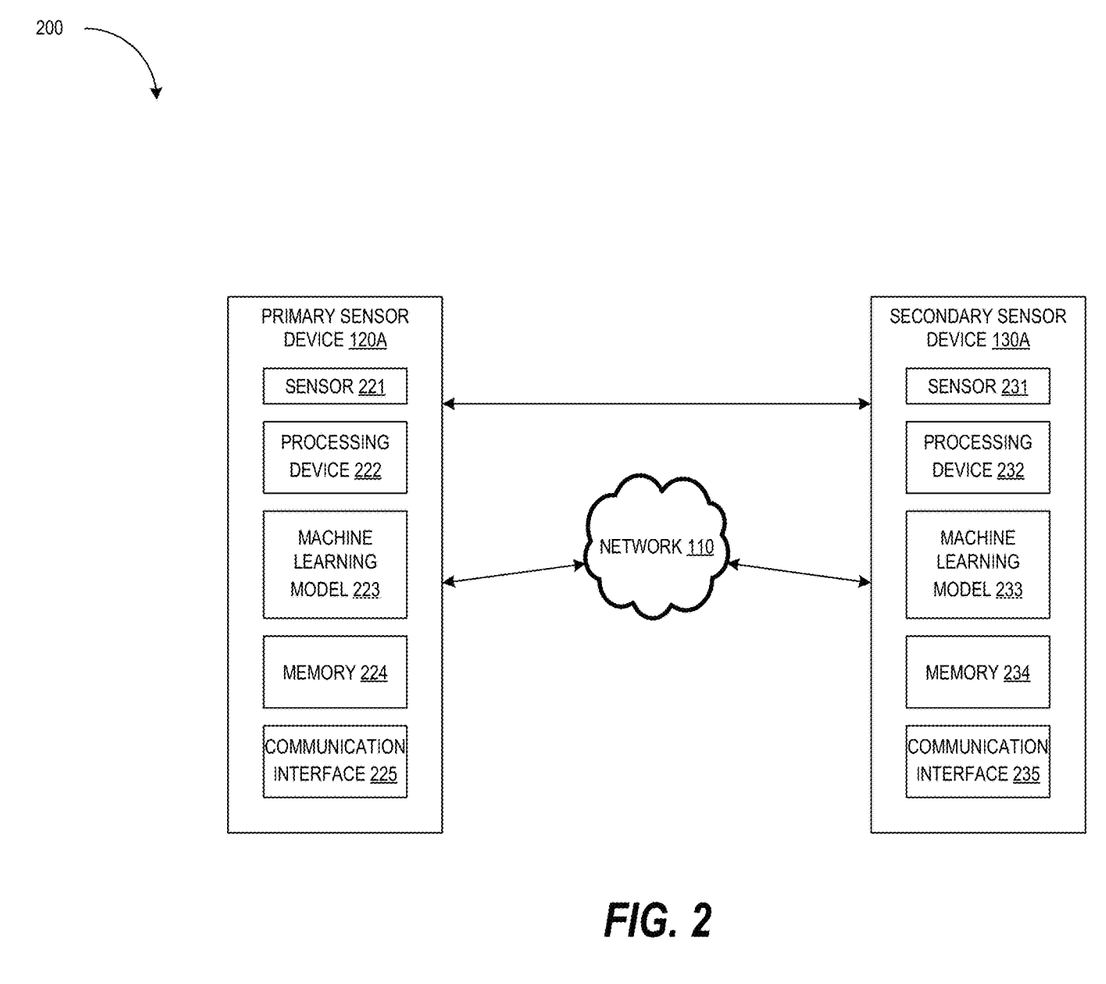
FIG. 2 is a block diagram illustrating an example system architecture, in accordance with one or more embodiments of the present disclosure.

FIG. 2 is a diagram illustrating an example system architecture 200, in accordance with some embodiments of the present disclosure. The system architecture 200 may be referred to as a sensor system. The system architecture 200 includes a network 110, primary sensor device 120A and secondary sensor device 130A. The primary sensor device 120A and the secondary sensor device 130A may be part of a sensor group, as discussed above. The primary sensor device 120A and the secondary sensor device 130A may each collect, obtain, detect, etc., sensor data. The sensor data may provide information about the area, environment, etc., where a sensor is located. The primary sensor device 120A may be coupled to the secondary sensor device 130A directly and/or via the network 110. The network 110 may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof. Each of the primary sensor device 120A and the secondary sensor device 130A may be a computing device. A computing device may be a device that may execute services, processes, applications, apps, instructions, etc., to perform one or more operations (e.g., to obtain sensor data, process/analyze the sensor data, generate output/inferences, etc.).

Primary sensor device 120A includes a sensor 221, a processing device 222, a machine learning model 223, a memory 224, and a communication interface 225. The sensor 221 may capture, obtain, take, etc., pictures and/or video (e.g., that obtain sensor data) of an area, environments, etc. For example, the sensor 221 may be a camera sensor, an audio sensor, a thermal sensor, etc. The processing device 222 may be one or more devices that execute instructions (e.g., executes machine instructions, code, machine code, etc.). Examples of a processing device may include, but are not limited to a controller, a system-on-a-chip (SoC), a field-programmable gate array (FPGA), an application-specific integrated circuit (ASIC), a central processing unit (CPU), a processor, a multi-core processor, a graphics processing unit (GPU), etc. The processing device 222 may analyze, process, etc., sensor data using machine learning model 223. For example, the processing device 222 may execute the machine learning model 223 (e.g., a neural network) and may provide the sensor data as an input to the machine learning model 223. The communication interface 225 may be hardware, software, firmware, or a combination thereof, that allows the primary sensor device 120 to communicated data with the secondary sensor devices 130A (and other devices). For example, the communication interface 225 may be a network interface card, a port, a plug, a connector, etc.

The memory 224 may be a device, circuit, component, etc., that may store data, such as sensor data generated/obtained by the sensor 221. For example, the memory 224 may be a data storage device (e.g., hybrid hard drive, solid-state drive, a memory card, any storage device utilizing solid-state memory, a hard disk drive, any storage device utilizing magnetic media/medium, etc.). In another example, the memory 224 may be a secure digital (SD) card, a miniSD card, a microSD card, a compact flash (CF) card, a multimedia card (MMC), an eXtreme digital (xD) card, etc. The memory 224 (e.g., a data storage device) may include a controller (e.g., a processing device) that may allow access to the memory 224 (e.g., may allow the processing device 222 to read and/or write data to the memory 224. The memory 224 may be configured for long-term storage of data and may retain data between power on/off cycles of the data storage device. The memory may include solid-state memory. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, triple level cell memory, X4 cell memory, etc.), NOR memory, EEPROM, Ferroelectric Memory (FeRAM), magnetoresistive RAM (MRAM), or other discrete solid-state memory chips. The memory may also include magnetic media (including shingle magnetic recording), optical disks, floppy disks, electrically programmable read only memories (EPROM), electrically erasable programmable read only memories (EEPROM), etc.

Secondary sensor device 130A includes a sensor 231 (e.g., a camera sensor, an audio sensor, etc.), a processing device 232, a machine learning model 233, and a memory 234. The sensor 231 may capture, obtain, take, etc., sensor data (e.g., video, images, temperatures, sounds, etc.) of an area or environment where the secondary sensor device 130A is located. The processing device 232 may be one or more devices that execute instructions (e.g., an SoC, FPGA, ASIC, CPU, GPU, processor, processing core, etc.). The processing device 232 may analyze, process, etc., sensor data using machine learning model 233. For example, the processing device 232 may execute machine learning model 233 and may provide sensor data as an input to the machine learning model 233. The communication interface 235 may be hardware, software, firmware, or a combination thereof, that allows the secondary sensor device 130A to communicated data with the primary sensor device 120A (and other devices). The memory 234 may be a device, circuit, component, etc., that may store data, such as sensor data generated/obtained by the sensor 231. For example, the memory 224 may be a hybrid hard drive, a solid-state drive, a memory card, any storage device utilizing solid-state memory, a hard disk drive, any storage device utilizing magnetic media/medium, a secure digital (SD) card, a miniSD card, a microSD card, a compact flash (CF) card, a multimedia card (MMC), an eXtreme digital (xD) card, etc.

In one embodiment, the sensor 231 may consume less power than the sensor 221. For example, sensor 231 may have a lower resolution, may detect fewer colors, may have a lower framerate, etc., than the sensor 221. In another example, the sensor 231 may have a lower bit depth (e.g., less quantization, detect few colors, etc.). This may allow the sensor 231 to use less power than the sensor 221. In another embodiment, the processing device 232 may use less power than the processing device 222. For example, the processing device 232 may include fewer processing cores than the processing device 222. In another example, the processing device 232 may have a lower clock speed (e.g., frequency) than the processing device 222. This may allow the processing device 232 to consume less power than the processing device 222. In a further embodiment, the machine learning model 233 may use/consume less power than the machine learning model 223 when executed. For example, the machine learning model 233 may include fewer nodes, layers, weights, etc., than the machine learning model 223. This may allow the machine learning model 233 to generate inferences/output more quickly which reduces the amount of power used to execute the machine learning model 233.

As discussed above, the secondary sensor device 130A may be a sensor device that continually obtains sensor data (e.g., every 10 milliseconds, every second, or some other appropriate period of time). The secondary sensor device 130A may be referred to as always-on device. The primary sensor device 120A may not capture, obtain, etc., sensor data until the secondary sensor device 130A indicates to the primary sensor device 120A that the primary sensor device 120A should capture, obtain, etc., sensor data (e.g., causes or triggers the primary sensor device 120A to capture, obtain, etc., sensor data). This allows the primary sensor device 120A (and/or components of the primary sensor device 120A) to remain in a lower power state until the primary sensor device 120A is triggered by the secondary sensor device 130A. Because the secondary sensor device 130A is a lower power device (e.g., includes components that use less power as discussed above), the system architecture 200 may use power more efficiently.

In one embodiment, the processing device 222 may receive activation data from the secondary sensor device 130A. For example, the secondary sensor device 130A may determine that a threshold, criteria, condition, etc., has been met based on sensor data obtained by the secondary sensor device 130A, as discussed in more detail below. The secondary sensor device 130A may trigger the primary sensor device 120A by transmitting activation data (e.g., data indicating that the primary sensor device 120A should start obtaining, gathering, recording, detecting, etc., sensor data) to the primary sensor device.

In one embodiment, the processing device 222 may cause the sensor 221 to obtain sensor data based on the activation data. For example, the processing device 222 may transmit a message to the sensor 221 to instruct the sensor 221 to being obtaining (e.g., collecting, gathering, recording, detecting, etc.) sensor data. In another example, the processing device 222 may transition the sensor 221 from a first power state to a second power state. The sensor 221 may use/consume less power in the first power state than the second power state. For example, the first power state may be a low power state and the second power state may be a normal/high power state. This allows the primary sensor device 120A to reduce power/energy usage until the primary sensor device 120A is triggered by the secondary sensor device 130A. In another embodiment, the processing device 222 may also transition from a lower power state to a higher power state based on the activation data. For example, the processing device 222 may be in a lower power state where a lower clock speed and/or fewer processing cores are used. When the processing device 222 receives the activation data, the processing device 222 may transition to a higher power state where a higher clock speed and more processing cores are used.

In one embodiment, the processing device 222 may generate one or more inferences, output, etc., using the machine learning model 223. For example, the processing device 222 may execute the machine learning model 223 and may provide the sensor data (obtained by the sensor 221) to the machine learning model 223. The machine learning model 223 may generate one or more inferences, output, etc., based on the sensor data. For example, the machine learning model 223 may generate a bounding box around an object in an image/video. In another example, the machine learning model 223 may indicate that a particular type of object (e.g., a person, an animal, etc.) was detected.

In one embodiment, the machine learning model 223 may use the activation data (received from the secondary sensor device 130A) and the sensor data to generate the one or more inferences. The activation data may provide additional information and/or data that may be used by the machine learning model 223 to generate the one or more inferences. For example, the activation data may indicate a portion of an image (e.g., the top left corner, the middle portion, etc.) that the machine learning model 223 should process. This may allow the machine learning model 223 to generate inferences more quickly because the machine learning model 223 may not process the whole image, but rather, a portion of the image or other sensor data (as indicated in the activation data).

In one embodiment, the processing device 222 may adjust one or more parameters (e.g., settings, configurations, operating parameters, etc.) of the sensor 221 based on the activation data. For example, the activation data may indicate lighting conditions (e.g., time of day, amount of light, etc.) in the area where the primary sensor device 120A and/or the secondary sensor device 130A are located. The processing device 222 may adjust the shutter speed, aperture, exposure time, frame rate, contrast, gain, ISO settings, etc., of the sensor 221 to account for the lighting conditions.

In another example, the activation data may indicate that the status of an object which was detected by the secondary sensor device 130A. The status may be information about the object, such as whether the object was moving and the speed of the object. The processing device 222 may adjust the shutter speed of the sensor 221 to reduce image/motion blur in the sensor data (e.g., images, videos, etc.).

In one embodiment, the activation data may include intermediate output from intermediate layers of the machine learning model 233 of the secondary sensor device 130A. For example, the machine learning model 233 may include a subset of layers, nodes, and/or weights of the machine learning model 223 (e.g., the first few layers of the machine learning models 223 and 233 may be the same). Thus, the processing device 222 may not pass the sensor data received from the secondary sensor device 130A through the first few layers of the machine learning model 223. For example, the output from the intermediate layers of the machine learning model 233 of the secondary sensor device 130A (e.g., intermediate layer output) may be directly provided as an input to intermediate layers of the machine learning model 223 of the primary sensor device 120A. This may be referred to as bypassing layers of the machine learning model 223. This may allow the primary sensor device 120A to operate more quickly and/or efficiently.

In one embodiment, the processing device 222 may also receive the sensor data (e.g., additional sensor data) generated by the secondary sensor device 130A. The processing device 222 may use the additional sensor data and the sensor data generated by the sensor 221 to generate one or more inferences. For example, the secondary sensor device 130A may have a different view of an area and/or object. Thus, the images (e.g., sensor data) generated by the secondary sensor device 130A may show a different side of the area and/or object. The additional sensor data (e.g., additional images of the area and/or object obtained by the secondary sensor device 130A) may allow the processing device 222 to generate better inferences and/or output. For example, the machine learning model 223 may perform face/facial detection of people in images. Having multiple images that include different views of the face of a person may allow the machine learning model 223 to detect faces more quickly, accurately, efficiently, etc.

In one embodiment, the processing device 222 may transmit adjustment data to the secondary sensor device 130A (and/or other secondary sensor devices in the sensor group). The adjustment data may be information/data indicating to the secondary sensor device 130A that the way the inferences/outputs are generated by the machine learning model 233 should be adjusted, modified, etc. The secondary sensor device 130A may adjust the generation of one or more inferences based on the adjustment data. For example, the secondary sensor device 130A may have transmitted activation data indicating that a person was detected in an area by the secondary sensor device 130A. The processing device 222 may cause the sensor 221 to obtain sensor data and may analyze the sensor data using the machine learning model 223. The machine learning model may generate output indicating that there was no person detected in the sensor data (e.g., the image). This may indicate that the secondary sensor device 130A incorrectly determined that a person was in the area. The processing device 222 may transmit the adjustment data to the secondary sensor device 130A and the secondary sensor device 130A may use the adjustment data to reduce errors and/or false positives. For example, the adjustment data may include new/updated weights and/or nodes that should be used in the machine learning model 233 (e.g., a neural network). In another example, the adjustment data may include updated thresholds (e.g., an updated confidence threshold) for the outputs generated by the machine learning model 233. In a further example, the adjustment data may also include settings and/or parameters of for the sensor 231 (e.g., shutter speed, frame rate, ISO setting, apertures, exposure time, etc.). Transmitting the adjustment data to the secondary sensor device 130A may be referred to as providing feedback to the secondary sensor device 130A.

In one embodiment, the sensor 231 of the secondary sensor device 130A may continually obtain (e.g., detect, sense, collect, etc.) sensor data (e.g., images, audio, temperatures, etc.). For example, the sensor 231 may obtain sensor data every 15 milliseconds, every 500 milliseconds, etc.

In one embodiment, the processing device 232 may generate one or more inferences based on the sensor data (obtained by the sensor 231) and the machine learning model 233. For example, the processing device may provide the sensor data as input to the machine learning model 233 to generate the one or more inferences (e.g., output). The processing device 232 may analyze the inferences/output to determine whether one or more conditions, criterion, thresholds, etc., are met. For example, the processing device 232 may analyze the inferences/output to determine whether a person was detected, a face was detected, movement was detected, etc.

In one embodiment, the processing device 232 may transmit activation data to the primary sensor device 120A if the one or more conditions, criterion, thresholds, etc., are met. For example, if a person or face is detected in an image (e.g., sensor data) obtained by the sensor 231 (e.g., a camera sensor), the processing device 232 may transmit the activation data to the primary sensor device 120A. The secondary sensor device 130A may trigger the primary sensor device 120A by transmitting activation data (e.g., data indicating that the primary sensor device 120A should start obtaining, gathering, recording, detecting, etc., sensor data) to the primary sensor device 120A.

In one embodiment, the processing device 232 may generate one or more inferences, output, etc., using the machine learning model 233. For example, the processing device 232 may execute the machine learning model 233 and may provide the sensor data (obtained by the sensor 231) to the machine learning model 233. The machine learning model 233 may generate one or more inferences, output, etc., based on the sensor data. For example, the machine learning model 233 may generate a bounding box around an object in an image/video. In another example, the machine learning model 233 may indicate that a particular type of object (e.g., a person, an animal, etc.) was detected.

In one embodiment, the activation data may provide additional information and/or data that may be used by the machine learning model 223 to generate more inferences, as discussed above. For example, the activation data may indicate that one or more parameters of the sensor 221 of the secondary sensor device 130A should be adjusted. In another example, the activation data may indicate a portion of the sensor data that the primary sensor device 120A should focus on.

In one embodiment, the processing device 232 may transmit the sensor data obtained by the sensor 231 to the secondary sensor device 130A. For example, the processing device 232 may transmit the sensor data that was analyzed by the machine learning model 233 and the activation data to the primary sensor device 120A. As discussed above, the primary sensor device 120A may use the sensor data obtained by the sensor 231 to generate inferences more quickly, efficiently, and/or accurately.

In one embodiment, the processing device 232 may receive adjustment data from the primary sensor device 120A. As discussed above, adjustment data may indicate to the processing device 232 that the way the inferences/outputs are generated by the machine learning model 233 should be adjusted, modified, etc. For example, the adjustment data may include new/updated weights and/or nodes that should be used in the machine learning model 233 (e.g., a neural network).

Figure 3:
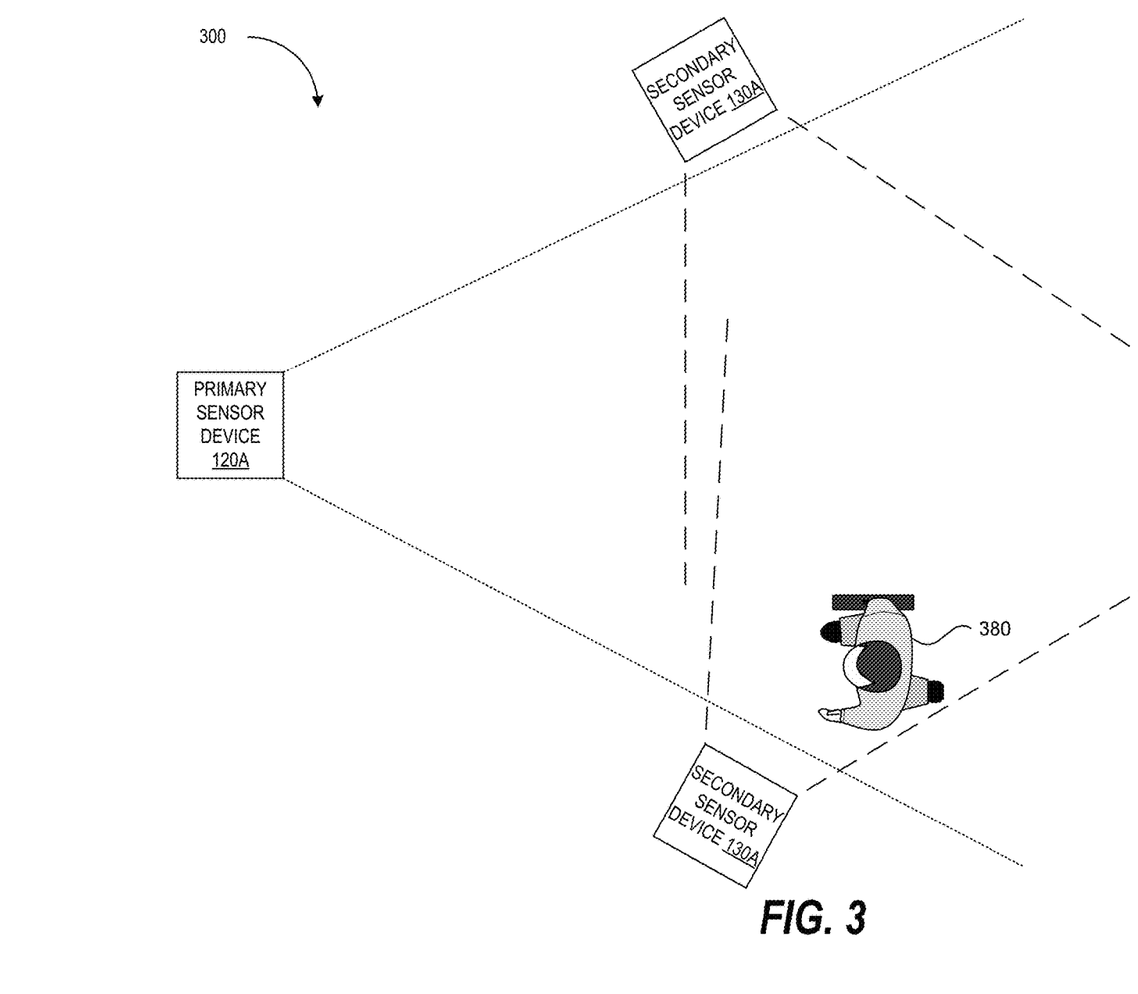
FIG. 3 is a block diagram illustrating an example system architecture, in accordance with one or more embodiments of the present disclosure.

FIG. 3 is a block diagram illustrating an example system architecture 300, in accordance with one or more embodiments of the present disclosure. The system architecture 300 primary sensor device 120A and secondary sensor devices 130A. The primary sensor device 120A and the secondary sensor devices 130A may be part of a sensor group, as discussed above. The primary sensor device 120A and the secondary sensor devices 130A may each collect, obtain, detect, etc., sensor data. The sensor data may provide information about the area, environment, etc., where a sensor is located. The primary sensor device 120A may be coupled to the secondary sensor device 130A directly and/or via a network, as discussed above.

In one embodiment, the secondary sensor devices 130A may consume less power than the primary sensor device 120A. For example, secondary sensor devices 130A may have a lower resolution, may detect fewer colors, may have a lower framerate, etc., than the primary sensor device 120A. This may allow the secondary sensor devices 130A to use less power than the primary sensor device 120A. As discussed above, the secondary sensor devices 130A may each be a sensor device that continually obtains sensor data (e.g., every 10 milliseconds, every second, or some other appropriate period of time). The secondary sensor devices 130A may be referred to as always-on devices. The primary sensor device 120A may not capture, obtain, etc., sensor data until the one or more of the secondary sensor devices 130A indicate to the primary sensor device 120A that the primary sensor device 120A should capture, obtain, etc., sensor data (e.g., causes or triggers the primary sensor device 120A to capture, obtain, etc., sensor data). This allows the primary sensor device 120A (and/or components of the primary sensor device 120A) to remain in a lower power state until the primary sensor device 120A is triggered by the secondary sensor device 130A. Because the secondary sensor device 130A is a lower power device (e.g., includes components that use less power as discussed above), the system architecture 200 may use power more efficiently.

As discussed above, the primary sensor device 120A and the secondary sensor devices 130A may be located in different locations. For example, the primary sensor device 120A is located on the left side of FIG. 3, one secondary sensor device 130A is located on the top of FIG. 3, and another secondary sensor device 130A is located on the bottom of FIG. 4. Each of the primary sensor device 120A and the secondary sensor devices 130A (e.g., each video camera, digital camera, etc.) may have different views of an area, location, etc. For example, the primary sensor device 120A may have a view indicated by the dotted lines originating from the primary sensor device 120A. In another example, the secondary sensor devices 130A may each have a view indicated by the dashed lines originating from the secondary sensor devices 130A.

As illustrated in FIG. 3, an object 380 (e.g., a person) may be moving through the area/location where the primary sensor device 120A and the secondary sensor devices 130A are located. The lower secondary sensor device 130A may detect the object 380. For example, the lower secondary sensor device 130A may obtain sensor data and may analyze/process the sensor data using a machine learning model. The inference/output of the machine learning model may indicate that the object 380 was detected.

The lower secondary sensor device 130A may transmit activation data to the primary sensor device 120A to cause, trigger, activate, etc., the primary sensor device 120A. The primary sensor device 120A may obtain sensor data (e.g., capture images/video of the area) based on the activation data. The primary sensor device 120A may analyze the sensor data to generate one or more inferences/outputs. For example, the primary sensor device 120A may analyze the sensor data to determine whether the object 380 has been detected, whether the object 380 was moving, a feature of the object (e.g., a face of the person), etc.

As discussed above, the activation data may provide additional information and/or data that may be used by the primary sensor device 120A to generate the one or more inferences. For example, the activation data may indicate that the primary sensor device 120A should focus on the right half of the image captured by the primary sensor device 120A because that is where the object 380 is located. The activation data may indicate that the primary sensor device 120A should adjust parameters (e.g., settings, operating parameters, etc.) of a sensor. For example, the activation data may indicate that the primary sensor device 120A should adjust a shutter speed.

Figure 4:
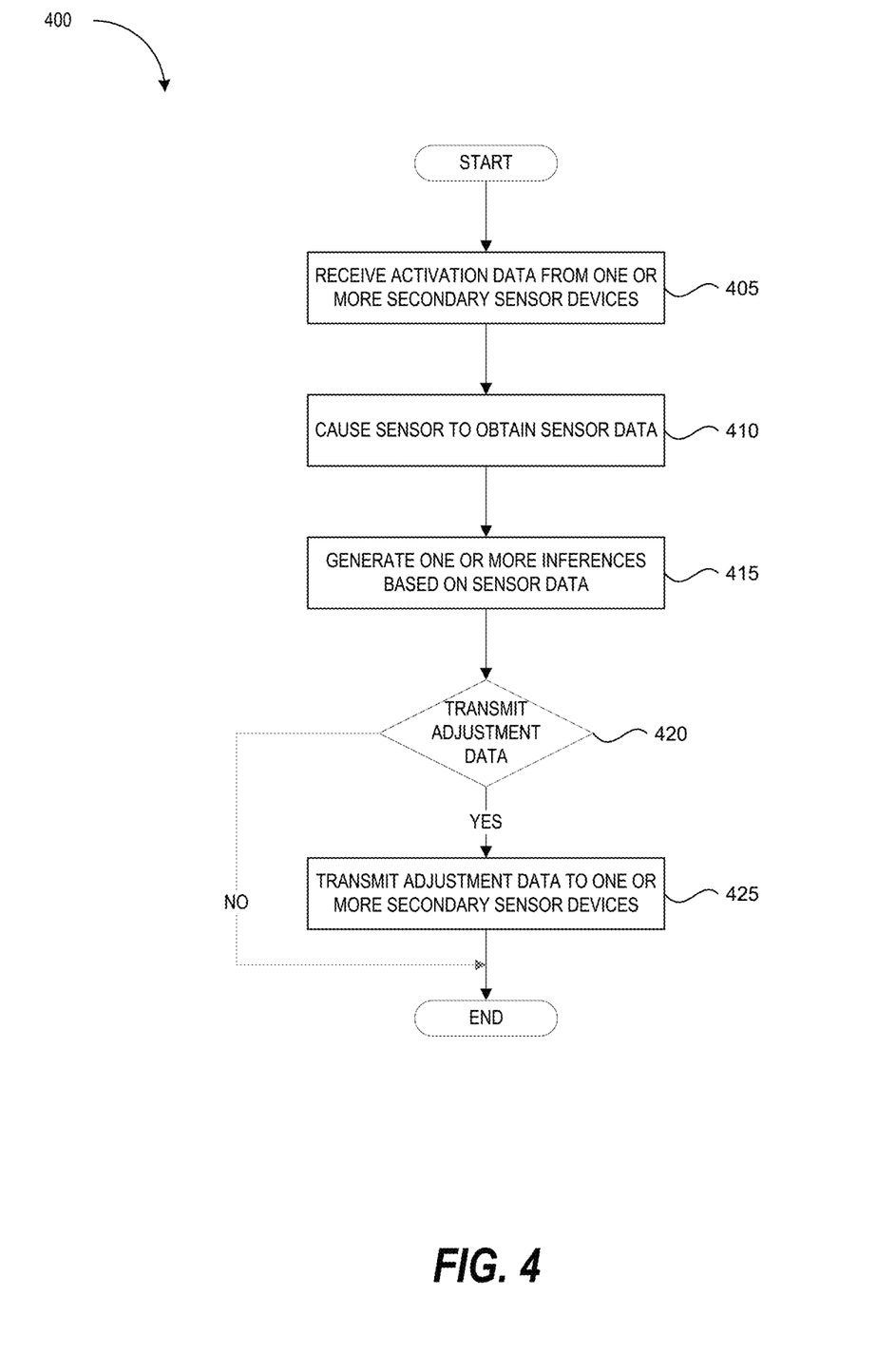
FIG. 4 is a flowchart illustrating an example a process for processing sensor data, in accordance with one or more embodiments of the present disclosure.

FIG. 4 is a flowchart illustrating an example a process 400 for processing sensor data, in accordance with one or more embodiments of the present disclosure. The process 400 may be performed by a processing device (e.g., a processor, a central processing unit (CPU), a controller, an application-specific integrated circuit (ASIC), a field programmable gate array (FPGA), etc.) and/or a sensor device. For example, the process 400 may be performed by a processing device of a sensor device (e.g., a primary sensor device). The processing device and/or sensor device may be processing logic that includes hardware (e.g., circuitry, dedicated logic, programmable logic, microcode, etc.), software (e.g., instructions run on a processor to perform hardware simulation), firmware, or a combination thereof.

The process 400 begins at block 405 where the process receives activation data from one or more secondary sensor devices. Each of the secondary sensor devices may include a processing device, a sensor, and a machine learning model. The one or more secondary sensor devices may be always-on devices that may trigger or cause a primary sensor device to obtain sensor data. At block 410, the process 400 may cause a sensor to obtain sensor data based on the activation data. For example, the process 400 may transition the sensor from a lower power state to a higher power state. In another example, the process 400 may instruct the sensor to obtain sensor data. At block 415, the process 400 may generate one or more inferences (e.g., outputs) based on the sensor data. For example, the process 400 may execute a machine learning model and may provide the sensor data to the machine learning model as an input.

At block 420, the process 400 may optionally determine whether to transmit adjustment data. For example, if the process 400 determines whether the activation data was incorrectly transmitted by one or more secondary sensor devices (e.g., whether there was a false positive from one or more secondary sensor devices). If the adjustment data should be transmitted (e.g., there was a false positive from a secondary sensor device), the process 400 may transmit the adjustment data to one or more secondary sensor devices at block 425.

Figure 5:
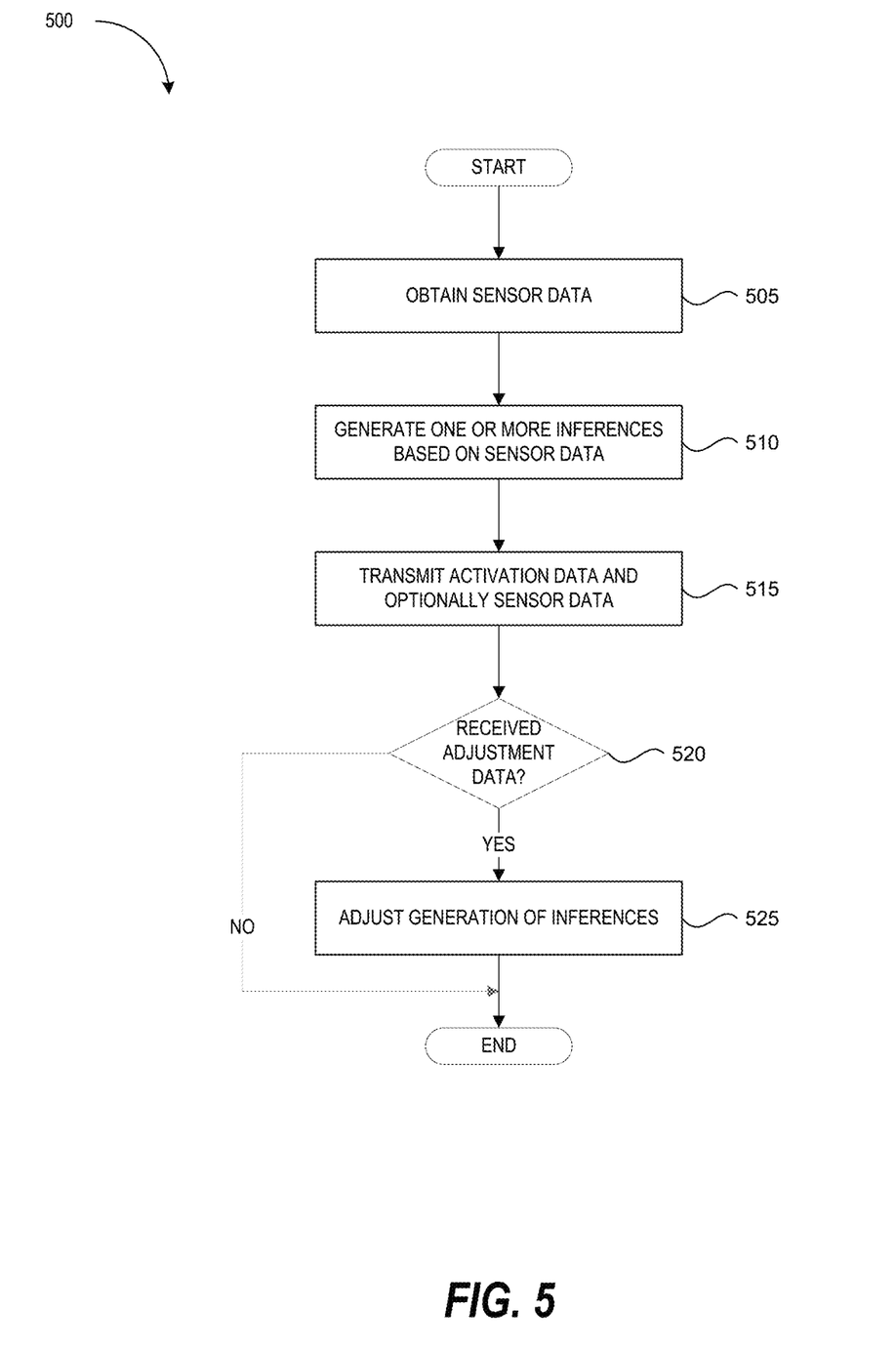
FIG. 5 is a flowchart illustrating an example a process for processing sensor data, in accordance with one or more embodiments of the present disclosure.

FIG. 5 is a flowchart illustrating an example a process 500 for processing sensor data, in accordance with one or more embodiments of the present disclosure. The process 500 may be performed by a processing device (e.g., a processor, a central processing unit (CPU), a controller, an application-specific integrated circuit (ASIC), a field programmable gate array (FPGA), etc.) and/or a sensor device. For example, the process 500 may be performed by a processing device of a sensor device (e.g., a secondary sensor device). The processing device and/or sensor device may be processing logic that includes hardware (e.g., circuitry, dedicated logic, programmable logic, microcode, etc.), software (e.g., instructions run on a processor to perform hardware simulation), firmware, or a combination thereof.

The process 500 begins at block 505 where the process obtains sensor data. As discussed above, the process 500 may obtain the sensor data continuously (e.g., every few milliseconds, every second, etc.). At block 510, the process 500 may generate one or more inferences based on the sensor data. For example, the process 500 may execute a machine learning model and may provide the sensor data as input to the machine learning model. At block 515, the process 500 may transmit activation data and optionally the sensor data. For example, the process 500 may determine that the inference, outputs, etc., from the machine learning model meet a criterion, threshold, condition, etc., and may transmit the activation data to a primary sensor device. The activation data may cause the primary sensor device may obtain sensor data.

At block 520, the process 500 determines whether adjustment data was received from the primary sensor devices. If adjustment data was received, the process 500 may adjust the generation of the inferences/outputs. For example, the process 500 may adjust weights and/or nodes of the machine learning model.

Although the present disclosure may refer to cameras (e.g., video cameras, digital cameras, camera devices, etc.) as examples of sensor devices, other types of sensor devices may be used in other embodiments. For example, audio sensors (e.g., audio devices, microphones, etc.) and thermal sensors (e.g., temperature sensors, thermal imaging sensors, etc.) may be used in other embodiments.

General Comments

Those skilled in the art will appreciate that in some embodiments, other types of distributed data storage systems may be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A sensor device, comprising:
 a sensor configured to obtain sensor data, the sensor data comprises at least an image;
 a communication interface configured to communicate with a set of secondary sensor devices, wherein:
 the set of secondary sensor devices comprise a set of secondary sensors and a set of secondary processing devices;
 the set of secondary sensors are configured to obtain additional sensor data; and
 the set of secondary processing devices are configured to process the additional sensor data based on a set of secondary machine learning models, and to generate activation data based on processing the additional sensor data through the set of secondary machine learning models; and
 a processing device coupled to the sensor, the processing device configured to:
 operate the sensor device in a first power state;
 receive the activation data from the set of secondary sensor devices;

transition the sensor device to a second power state that consumes more power than the first power state;

cause the sensor to obtain first sensor data based on the activation data; and generate one or more inferences based on the first sensor data and a machine learning model, wherein:

the activation data indicates a portion of the image to be analyzed using the machine learning model; and the sensor device at the second power state consumes more power than each secondary sensor device.

2. The sensor device of claim 1, wherein the one or more inferences are generated further based on the activation data.

3. The sensor device of claim 2, wherein the activation data indicates a portion of the sensor data to be analyzed using the machine learning model.

4. The sensor device of claim 3, wherein:

the sensor data further comprises a video;

the activation data indicates a portion of the video to be analyzed using the machine learning model.

5. The sensor device of claim 2, wherein the activation data comprises intermediate layer outputs of one or more secondary machine learning models of the set of secondary machine learning models.

6. The sensor device of claim 5, wherein the processing device is further configured to:

bypassing one or more layers of the machine learning model by providing the intermediate layer outputs to an intermediate layer of the machine learning model.

7. The sensor device of claim 1, wherein the processing device is further configured to:

adjust one or more parameters of the sensor based on the activation data.

8. The sensor device of claim 7, wherein the activation data comprises a status of an object detected by at least one of the set of secondary machine learning models.

9. The sensor device of claim 7, wherein the one or more parameters comprises one or more of a shutter speed, an exposure time, an aperture, a frame rate, and an ISO setting.

10. The sensor device of claim 1, the one or more inferences are generated further based on the additional sensor data.

11. The sensor device of claim 1, wherein the processing device is further configured to:

transmit adjustment data to the set of secondary sensor devices, wherein the set of secondary sensor devices adjust the generation of the one or more inferences based on the adjustment data.

12. The sensor device of claim 1, wherein:

the sensor device and one or more of the set of secondary sensor devices are positioned at different locations;

the first sensor data and the additional sensor data indicate different views of an object; and the first sensor data and the additional sensor data improves an accuracy of inferences generated by the machine learning model.

13. The sensor device of claim 1, wherein the set of secondary sensor devices are configured to continually obtain the additional sensor data.

14. A system comprising the sensor device and the set of secondary sensor devices of claim 1.

15. A sensor device, comprising:

a sensor configured to obtain sensor data, the sensor data comprises at least an image;

a communication interface configured to communicate with a primary sensor device, wherein:

the primary sensor device comprises a primary sensor and a primary processing device;

the primary sensor is configured to obtain primary sensor data; and the primary processing device is configured to process the primary sensor data through a primary machine learning model based on activation data; and a processing device coupled to the sensor, the processing device configured to:

receive the sensor data from the sensor;

generate one or more inferences based on the sensor data and a machine learning model, wherein the activation data indicates a portion of the image to be analyzed using the machine learning model; and transmit activation data to the primary sensor device based on the one or more inferences, wherein:

the sensor device consumes less power than the primary sensor device; and the activation data causes the primary sensor device to obtain additional sensor data.

16. The sensor device of claim 15, wherein:

the sensor data further comprises a video;

the activation data indicates a portion of additional sensor data to be analyzed using the primary machine learning model; and the activation data indicates a portion of the video to be analyzed using the machine learning model.

17. The sensor device of claim 15, wherein the activation data comprises intermediate layer outputs one or more intermediate layers of the machine learning model.

18. The sensor device of claim 15, wherein the sensor device and the primary sensor device are located at different locations.

19. The sensor device of claim 15, wherein the processing device is further configured to:

receive adjustment data from the primary sensor device; and adjust the generation of the one or more inferences based on the adjustment data.

20. The sensor device of claim 15, wherein the processing device is further configured to:

receive adjustment data from the primary sensor device; and adjust one or more parameters of the sensor based on the adjustment data.

21. The sensor device of claim 15, wherein the activation data comprises a status of an object detected by the machine learning model.

22. A system comprising the sensor device and the primary sensor device of claim 15.

23. A method, comprising:

operating a sensor device in a first power state;

receiving, by the sensor device, activation data from a set of secondary sensor devices, wherein:

the set of secondary sensor devices comprise a set of secondary sensors and a set of secondary processing devices;

the set of secondary sensors are configured to obtain additional sensor data; and the set of secondary processing devices are configured to process the additional sensor data based on a set of secondary machine learning models, and to generate the activation data based on processing the additional sensor data through the set of secondary machine learning models; and causing a sensor of the sensor device to obtain sensor data and first sensor data based on the activation data; and generating one or more inferences based on the first sensor data and a machine learning model, wherein:
the activation data indicates a portion of the sensor data to be analyzed using the machine learning model, wherein the sensor data comprises an image; and
the sensor device consumes more power than each of the set of secondary sensor devices.

\* \* \* \* \*